United States Patent [19]

Takayanagi et al.

[11] Patent Number: 5,352,721
[45] Date of Patent: Oct. 4, 1994

[54] THERMOPLASTIC RESIN COMPOSITION

[75] Inventors: Kenjiro Takayanagi; Koji Nishida; Kiyonori Suzuki, all of Yokkaichi, Japan

[73] Assignee: Mitsubishi Petrochemical Co., Ltd., Tokyo, Japan

[21] Appl. No.: 105,621

[22] Filed: Aug. 13, 1993

[30] Foreign Application Priority Data

Aug. 14, 1992 [JP] Japan ................... 4-216893

[51] Int. Cl.$^5$ .............................. C08K 5/55
[52] U.S. Cl. ...................... 524/183; 524/404; 524/405; 525/390; 525/397
[58] Field of Search .............. 524/405, 183, 404; 525/390, 397

[56] References Cited

U.S. PATENT DOCUMENTS

| | | | |
|---|---|---|---|
| 3,379,792 | 4/1968 | Finholt | 525/397 |
| 3,465,062 | 9/1969 | Holoch et al. | 524/138 |
| 3,817,919 | 6/1974 | Nakashio et al. | 525/390 |
| 4,487,918 | 12/1984 | Heitz et al. | 528/212 |
| 5,104,939 | 4/1992 | van der Meer et al. | 525/92 |
| 5,120,800 | 6/1992 | Tsukahara et al. | 525/390 |

*Primary Examiner*—Judy M. Reddick
*Attorney, Agent, or Firm*—Oblon, Spivak, McClelland, Maier & Neustadt

[57] ABSTRACT

There is disclosed a thermoplastic resin composition which comprises
(a) a polyphenylene ether and
(b) a polyamide resin, and
(c) 0.01 to 5 parts by weight of an acetal and
(d) 0.01 to 5 parts by weight of a Lewis acid based on 100 parts by weight of the above (a) and (b) in total.

14 Claims, No Drawings

THERMOPLASTIC RESIN COMPOSITION

BACKGROUND OF THE INVENTION

This invention relates to a thermoplastic resin composition which is excellent in impact resistance, heat resistance, and appearance and color hue of a molded product.

A polyphenylene ether (hereinafter referred to as "PPE") has been known as engineering plastics having excellent mechanical characteristics and heat resistance, and has been used by mixing with a styrene resin or others. However, it has drawback that solvent resistance is markedly bad and, in order to overcome the drawback, there have been proposed a blended material with a polyamide (e.g. Japanese Patent Publication No. 41663/1984) or a blended material with a polyester resin (e.g. Japanese Patent Publication No. 21662/1976).

However, in such a simple blend system, PPE and the polyamide resin have inherently poor compatibility with each other so that adhesiveness at an interface of this two phase structure is not good, whereby two phases can hardly take uniform and fine forms. Therefore, when shear stress is applied to molding processing such as injection molding, laminar peeling (delamination) is easily caused, whereby appearance of a resulting molded product is worsened and an interface of two phases becomes a defective portion. Thus, it is impossible to obtain a composition having excellent mechanical characteristics such as dimensional stability, heat resistance and rigidity and excellent physical characteristics such as solvent resistance.

Therefore, in order to improve compatibility with the blended resin and to improve impact resistance, a composition in which a compound having a polar group such as a carboxyl group, an imide group and an epoxy group and a rubbery material as an impact modifier are added to the composition comprising PPE and a polyamide resin has been proposed (Japanese Provisional Patent Publication No. 9753/1984).

In the above technique, whereas compatibility has been improved with a certain degree by using the impact modifier, new problem arises that a heat distortion temperature is lowered.

Also, such a polyphenylene ether resin composition has been utilized for an out-side plate material of an automobile such as a fender and door panel. However, since a large scale product is molded at a high temperature, an insufficient product is frequently produced, which is caused by a poor thermal stability, such as yellowing and silver streaking on the surface of the molded product.

Further, when a conventional compatibilizer such as maleic anhydride as described in Japanese Provisional Patent Publication No. 28248/1990, the problem occurred that color hue of the blended material becomes bad.

SUMMARY OF THE INVENTION

An object of the present invention is to improve compatibility of the conventional resin composition and to provide a thermoplastic resin composition excellent in heat resistance, impact resistance, and appearance and color hue of a molded product produced by high temperature molding.

That is, the present invention is a thermoplastic resin composition which comprises (a) a polyphenylene ether and
(b) a polyamide resin, and
(c) 0.01 to 5 parts by weight of an acetal and
(d) 0.01 to 5 parts by weight of a Lewis acid based on 100 parts by weight of the above (a) and (b) in total.

DESCRIPTION OF THE PREFERRED EMBODIMENTS

In the following, the present invention will be explained in more detail.

Polyphenylene Ether (a)

PPE to be used in the present invention has a structure represented by the formula:

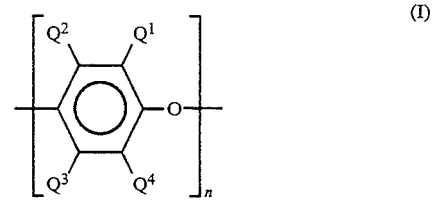

wherein $Q^1$, $Q^2$, $Q^3$ and $Q^4$ each represent a hydrogen atom, a halogen atom, a hydrocarbon group containing no tertiary α-carbon atom, a haloalkyl group in which a halogen atom(s) is substituted through at least two carbon atoms, a hydrocarbonoxy group, or a halohydrocarbonoxy group in which a halogen atom(s) is substituted through at least two carbon atoms; and n represents an integer of at least 50.

As the halogen atom, there may be mentioned a fluorine atom, a chlorine atom, a bromine atom and an iodine atom.

As the hydrocarbon group containing no tertiary α-carbon atom, there may be mentioned, for example, a lower alkyl group having 1 to 6 carbon atoms such as methyl, ethyl, propyl, isopropyl and butyl groups; an alkenyl group having 2 to 6 carbon atoms such as vinyl, allyl, butenyl and cyclobutenyl groups; an aryl group which may be substituted by a halogen atom such as phenyl, tolyl, xylyl and 2,4,6-trimethylphenyl groups; and an aralkyl group such as benzyl, phenylethyl and phenylpropyl groups.

As the haloalkyl group in which a halogen atom is substituted through at least two carbon atoms, there may be mentioned, for example, 2-chloroethyl, 2-bromoethyl, 2-fluoroethyl, 2,2-dichloroethyl, 2- or 3-bromopropyl, 2,2-difluoro-3-iodopropyl, 2-, 3-, 4- or 5-fluoroamyi, 2-chlorovinyl, chloroethylphenyl, ethylchlorophenyl, fluoroxylyl, chloronaphthyl and bromobenzyl groups.

As the hydrocarbonoxy group, there may be mentioned, for example, methoxy, ethoxy, propoxy, butoxy, phenoxy, ethylphenoxy, naphthoxy, methylnaphthoxy, benzyloxy, phenylethoxy and tolylethoxy groups.

As the halohydrocarbonoxy group in which a halogen atom(s) is substituted through at least two carbon atoms, there may be mentioned, for example, 2-chloroethoxy, 2-bromoethoxy, 2-fluoroethoxy, 2,2-dibromoethoxy, 2- or 3-bromopropoxy, chloroethylphenoxy, ethylchlorophenoxy, iodoxyloxy, chloronaphthoxy, bromobenzyloxy and chlorotolylethoxy groups.

In the PPE to be used in the present invention, there may include a copolymer of 2,6-dimethylphenol and 2,3,6-trimethylphenol, a copolymer of 2,6-dimethylphenol and 2,3,5,6-tetramethylphenol, and a copolymer of 2,6-diethylphenol and 2,3,6-trimethylphenol. Also, as the PPE of the formula (I), a modified PPE in which a styrene series monomer such as styrene, p-methylstyrene and α-methylstyrene is graft polymerized may be used.

Preparation processes of the above PPE are known in the art and, for example, there may be disclosed in U.S. Pat. Nos. 3,306,874, 3,306,875, 3,257,357 and 3,257,358, as well as Japanese Patent Publication No. 17880/1977 and Japanese Provisional Patent Publication No. 1197/1975.

As the preferred PPE (a), there may be mentioned those having alkyl substituents at two ortho-position to the ether oxygen atom bound position, and a copolymer of 2,6-dialkylphenol and 2,3,6-trialkylphenol. The PPE (a) preferably has an intrinsic viscosity measured at 30° C. in chloroform of 0.25 to 0.70 dl/g, more preferably 0.30 to 0.60 dl/g, particularly preferably 0.30 to 0.50 dl/g. If the intrinsic viscosity is less than 0.25 dl/g, impact resistance and heat resistance of the composition are insufficient, while if it exceeds 0.70 dl/g, molding of the composition becomes hard. In order to improve moldability of the resin, two kinds of PPEs having a high viscosity and a low viscosity may be used in combination.

Polyamide Resin (b)

The polyamide resin to be used in the present invention has a —CONH— bond in the polymer main chain and is capable of melting under heating. Representative examples thereof may include 4-nylon (polyvaleramide), 6-nylon (polycapramide), 6,6-nylon (polyhexamethyleneadipamide), 4,6-nylon (polytetramethyleneadipamide), 12-nylon (polydodecaneamide) and 6,10-nylon (polyhexamethylenesebacamide) (all trade names, available from E. I. du Pont de Nemours & Co.) and also a conventionally known crystalline or noncrystalline polyamide containing a monomer component such as an aromatic diamine and an aromatic dicarboxylic acid. Here, the noncrystalline polyamide is a polyamide having substantially no crystallinity measured by a differential thermal calorimetry (DSC).

Preferred polyamide resins (b) are 6,6-nylon, 6-nylon or a noncrystalline polyamide resin. As the polyamide resin (b), those having a relative viscosity measured at 25° C. in 98% conc. sulfuric acid of 2.0 to 8.0 are preferred.

Acetal (c)

The acetal to be used in the present invention may include a chain-structure acetal having the structure represented by the formula (II):

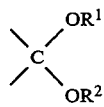

wherein $R^1$ and $R^2$ each represent a hydrogen atom, an alkyl group, a cycloalkyl group, or a functional group having at least one linkage of an ether linkage and an acetal linkage, or a cyclic acetal having the structure represented by the following formula (III):

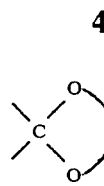

wherein $R^3$ represents an alkylene group, a cycloalkylene group or a functional group having at least one linkage of an ether linkage and an acetal linkage.

As the chain-structure acetal, there may be mentioned a low molecular weight polymer of formaldehyde such as paraformaidehyde, a low molecular weight polymer of acetaldehyde, and a low molecular weight copolymer of formaldehyde and other compounds such as cyclic acetals, cyclic ethers and cyclic thioformal. Of these acetals, a low molecular weight polymer of formaldehyde is particularly preferred.

As the cyclic acetal, there may be mentioned, for example, a monocyclic acetal such as 1,3-dioxolan, trioxane, tetraoxane, 1,3,5-trioxacycloheptane, 1,3-dioxepane, 4H, 7H-1,3-dioxepine, 1,3,6-trioxacyclooctane, 1,3,6,9-tetraoxacyclodecane, 1,3,6,9-tetraoxacycloundecane, 1,3,6,9,12-pentaoxacyclotetradecane and 1,3,6,9,12,15-hexaoxacycloheptadecane; and a dicyclic acetal such as 2,7-dioxabicyclo[2.2.1]heptane. Of these acetals, the monocyclic acetal is preferred and 1,3-dioxotan, trioxane and tetraoxane are particularly preferred.

Further, as the acetal to be used in the present invention, there may be mentioned a polymer of the above-mentioned chain-structure acetal or cyclic acetal, particularly an oxymethylene homopolymer substantially comprising an oxymethylene unit alone and prepared by using, as a starting material, a cyclic acetal such as a formaldehyde monomer, its trimer (trioxane) and a tetramer (tetraoxane); or an oxymethylene copolymer comprising an oxymethylene unit and an oxyalkylene unit having 2 or more carbon atoms, which is prepared from the above starting material and a cyclic ether such as ethylene oxide, propylene oxide, epichlorohydrin and 1,3-dioxorane, or a cyclic acetal. Also, there may include the material in which the terminal OH group(s) of the above polymers is/are etherified, urethanized or esterified.

Lewis Acid (d)

As the Lewis acid to be used in the present invention, there may be mentioned, for example, a carboxylate, a nitrate, a carbonate, a sulfate, a chloride and an oxide of a metal such as Cd, Zn and Sb, more specifically, cadmium stearate, zinc stearate, tribasic sulfate, zinc oxide, a phthalate and antimony pentachloride. Also, there may be mentioned an organic compound which shows Lewis acid properties including various boron compounds such as triatkyl boran, trialkyl borate, boric acid and halogenated boron; various quinones, tetracyanoethylene and trinitrobenzene. Particularly preferred is a boron compound.

Composition Ratio of Constitutional Components

The composition ratio of Components (a) and (b) described above with the total weight of (a) and (b) being 100% by weight is preferably shown below.

Component (a) : 2 to 98% by weight, preferably 15 to 75% by weight, particularly preferably 25 to 60% by weight.

Component (b): 98 to 2% by weight, preferably 85 to 25% by weight, particularly preferably 75 to 40% by weight.

Also, the composition ratio (amount) of Components (c) and (d) are each 0.01 to 5 parts by weight, preferably 0.1 to 3 parts by weight, particularly preferably 0.2 to 1.5 parts by weight based on the total amount of (a) and (b) as 100 parts by weight.

The amounts of Components (a) and (b) are determined by referring to heat-resistant rigidity, solvent resistance and impact resistance of the final composition. If the amount of Component (a) is less than the above range, heatresistant rigidity of the final composition is insufficient, while if it exceeds the above range, solvent resistance and impact resistance are insufficient. Also, if the amount of Component (b) is less than the above range, impact strength is insufficient, while if it exceeds the above range, heat-resistant rigidity is insufficient.

Further, If the amounts of Components (c) and (d) are less than the above ranges, impact resistance and heat resistance become insufficient and difficulty occurs in appearance of the molded product, while if they exceed the above ranges, difficulties occur in rigidity, heat resistance and appearance.

Additional Components

To the thermoplastic resin composition of the present invention, other additional components may be added. For example, as additional components, additives such as an antioxidant, a weatherability-improving agent, a nucleating agent, a flame retardant, a plasticizer and a flowability improver which have been conventionally known may be used in amounts as long as they do not impair the effects of the present invention. Further, it is effective for improving rigidity, heat resistance or dimensional stability to add an organic or inorganic filler, a reinforcing agent, particularly glass fiber, mica, talc, wallastonite, potassium titanate, calcium carbonate or silica. Various coloring agents and dispersants thereof which have been conventionally known may be used for practical use in amounts which do not impair the effects of the present invention.

Further, to the thermoplastic resin composition according to the present invention, various kinds of impact resistance improver, i.e. a rubbery substance which is to be added for improving impact resistance may be added. For example, there may be mentioned an elastomer such as an alkenylaromatic compound-conjugated diene copolymer and a polyolefin type copolymer, and an modified product of the above elastomer modified by an $\alpha,\beta$-unsaturated carboxylic acid or an acid anhydride thereof. The amount of the additional component is preferably 1 to 30 parts by weight, more preferably 2 to 20 parts by weight, particularly preferably 5 to 15 parts by weight based on 100 parts by weight of the total amounts of the Components (a) and (b).

Preparation and Molding Methods of Composition

As a melting and kneading methods for obtaining the thermoplastic resin composition of the present invention, a kneading method generally practiced for a thermoplastic resin may be applied to. For example, there may be mentioned the method of uniformly mixing respective components in powder or granular state as well as, if necessary, additional components as described at the column of the additional component by, for example, a Henschel mixer, ribbon blender or V-type blender, and then kneading with, for example, a single axis or plural axis kneading extruder, a roll mixer and a Banbury mixer.

As to kneading order, all components may be kneaded simultaneously, or kneading may be carried out by using a previously kneaded blend material. Further, kneading may be carried out by feeding the respective components from several feeding ports provided at midway of an extruder. Also, it is desired to deaerate volatile components from a bent port(s) provided at midway of an extruder.

A molding processing method of the thermoplastic resin composition of the present invention is not particularly limited, and there may be suitably used a molding method generally used for a thermoplastic resin, i.e. a molding method such as injection molding, blow molding, extrusion molding, sheet molding, thermal molding, rotary molding, lamination molding and press molding.

EXAMPLES

In the following, the present invention will be described in detail by referring to Examples.

Examples 1 to 12

(a) Polyphenylene Ether
Poly (2,6-dimethyl-i, 4-phenylene ether) having an intrinsic viscosity measured at 30° C. in chloroform of 0.45 dl/g was used.

(b) Polyamide Resin
Nylon-6 (trade name: Ultramid B-4, produced by BASF AG, an injection molding grade) and
Nylon-6, 6 (trade name: Ultramid A-3, produced by BASF AG, an injection molding grade) were used.

(c) Acetal
c-1: Commercially available trioxane (produced by Wako Junyaku K.K.) and
c-2: Commercially available polyacetal (trade name: Ultraform N2320, produced by BASF AG, an injection molding grade) were used.

(d) Lewis acid
Commercially available boric acid (produced by Wako Junyaku K.K.) was used.

Impact Resistance Improver

Commercially available maleic anhydride-modified ethylenepropylene random copolymer (T7741P: trade name, produced by Japan Synthetic Rubber Co., Ltd., maleic anhydride content: 0.5 to 1% by weight) and commercially available hydrogenated styrene-butadiene block copolymer (Kraton G1651: trade name, produced by Shell Chemical Co., Japan, styrene content: 33% by weight) were used by mixing with a ratio of 2:8.

The above respective components were sufficiently mixed by a super mixer with a composition ratio as shown in Table 1.

Then, the mixtures were charged into a TEX 44 biaxis extruder (trade name) manufactured by Nippon Seikosho Co. (L/D=30, provided with a bent) from the first hopper, and from the mid point of the kneading machine (extruder), Component (b) was fed to effect melting and kneading under conditions of a setting temperature of 270° C. and a screw rotary number of 400 rpm. The resulting resin compositions were each extruded with a shape of strand and pelletized by a cutter.

The respective pellets of the above resin compositions were subjected to injection molding by using an inline screw type injection molding machine IS-90B Model (trade name, manufactured by Toshiba Kikai Seisakusho Co.) at a cylinder temperature of 280° C. and a mold cooling temperature of 70° C. to prepare test pieces.

At injection molding, drying was carried out until immediately before subjecting to injection molding by using a reduced pressure dryer under conditions of 0.1 mmHg and 80° C. for 48 hours. The injection molded test pieces were placed in a desiccator immediately after molding and allowed to stand at 23° C. for 4 to 6 days, and then evaluation tests were conducted. The results are shown in Table 1.

COMPARATIVE EXAMPLE 1

Procedures were carried out in the same manner as in Example 1 except for not formulating a compatibilizing agent for the polyphenylene ether and polyamide resin. The formulation ratio and the test results are shown in Table 1.

COMPARATIVE EXAMPLE 2

Procedures were carried out in the same manner as in Example 1 except for formulating maleic anhydride as a compatibilizing agent for the polyphenylene ether and polyamide resin. The formulation ratio and the test results are shown in Table 1.

COMPARATIVE EXAMPLE 3

Procedures were carried out in the same manner as in Example 1 except for formulating a polyacetal alone as a compatibilizing agent for the polyphenylene ether and polyamide resin. The formulation ratio and the test results are shown in Table 1.

COMPARATIVE EXAMPLE 4

Procedures were carried out in the same manner as in Example 1 except for formulating boric acid alone as a compatibilizing agent for the polyphenylene ether and polyamide resin. The formulation ratio and the test results are shown in Table 1.

COMPARATIVE EXAMPLE 5

Procedures were carried out in the same manner as in Example 1 except for formulating 15 parts by weight of a polyacetal based on 100 parts by weight of the polyphenylene ether and polyamide resin in total. The formulation ratio and the test results are shown in Table 1.

COMPARATIVE EXAMPLE 6

Procedures were carried out in the same manner as in Example 1 except for formulating 15 parts by weight of boric acid based on 100 parts by weight of the polyphenylene ether and polyamide resin in total. The formulation ratio and the test results are shown in Table 1.

The respective physical properties and various characteristics were measured and evaluated according to the following methods.

(1) Flexural Modulus

Flexural modulus was measured according to ISO R178-1974 Procedure 12 (JIS K 7203) by using an Instron tester.

(2) Izod Impact Strength

Izod impact strength was measured according to ISO R180-1969 (JIS K 7110) Izod impact strength with notch by using an Izod impact tester manufactured by Toyo Seiki Seisakusho.

(3) Heat Distortion Temperature

Heat distortion temperature was measured according to JIS K 7207 by using an HDT tester manufactured by Tokyo Seiki Seisakusho with a load of 4.6 kg.

(4) Retentive Molding Stability

Retentive molding stability was measured by using an inline screw type injection molding machine IS-90B Model (trade name, manufactured by Toshiba Kikai Seisakusho Co.) and retaining the composition in the machine at a cylinder temperature of 300° C. for 30 minutes and then injection molding was carried out at a mold cooling temperature of 70° C. to prepare a test piece (a plate having a size of 120 mm × 120 mm with a thickness of 2 mm).

With respect to the test piece prepared, presence or absence of yellowing and silver streaking on the surface of the molded product were observed and evaluated by the following evaluation standard.

⊚: Extremely good
O: Good
X: Bad (5) Color Hue

Color value (brilliance) and color hue (Lab value) of the test piece prepared in the above item (4) were measured according to JIS Z 8722 (method of measuring color of a material) by using a color hue-color difference meter "1001DP" (trade name, manufactured by Nippon Denshoku Kogyo K.K. Japan) with the following evaluation standard.

⊚: Extremely good
O: Good
X: Bad

TABLE 1

| Formulation ratio | Examples | | | | | | | | |
|---|---|---|---|---|---|---|---|---|---|
| (part by weight) | 1 | 2 | 3 | 4 | 5 | 6 | 7 | 8 | 9 |
| (a) Polyphenylene ether | 50 | 50 | 50 | 50 | 50 | 50 | 50 | 50 | 50 |
| (b) Nylon-6,6 | 50 | 50 | 50 | 50 | 50 | 50 | 50 | 50 | 50 |
| (c) Acetal | | | | | | | | | |
| c-1: Trioxane | 0.5 | 3 | — | — | — | — | — | — | — |
| c-2: Polyacetal | — | — | 0.01 | 0.5 | 1 | 3 | 5 | 0.5 | 0.5 |
| (d) Boric acid | 1 | 1 | 1 | 1 | 1 | 1 | 1 | 0.1 | 5 |
| Impact resistance improver | 10 | 10 | 10 | 10 | 10 | 10 | 10 | 10 | 10 |
| Mechanical characteristics | | | | | | | | | |
| Flexural modulus (MPa) | 2200 | 2270 | 2360 | 2260 | 2280 | 2320 | 2290 | 2300 | 2200 |
| Izod impact strength with notch (kJ/m$^2$) | 13 | 14 | 10 | 20 | 19 | 16 | 12 | 10 | 13 |
| Heat distortion temperature (°C.) | 182 | 183 | 180 | 181 | 182 | 185 | 189 | 177 | 186 |
| Retentative molding | ⊚ | ⊚ | O | ⊚ | ⊚ | O | O | O | O |

TABLE 1-continued

| Formulation ratio | Examples | | | Comparative example | | | | | |
|---|---|---|---|---|---|---|---|---|---|
| (part by weight) | 10 | 11 | 12 | 1 | 2 | 3 | 4 | 5 | 6 |
| (a) Polyphenylene ether | 50 | 80 | 20 | 50 | 50 | 50 | 50 | 50 | 50 |
| (b) Nylon-6,6 | — | 20 | 80 | 50 | 50 | 50 | 50 | 50 | 50 |
| Nylon-6 | 50 | — | — | — | — | — | — | — | — |
| (c) Acetal | | | | | | | | | |
| c-1: Trioxane | — | — | — | — | — | — | — | — | — |
| c-2: Polyacetal | 0.5 | 0.5 | 0.5 | — | — | 1 | — | 15 | 1 |
| (d) Boric acid | 1 | 1 | 1 | — | — | — | 1 | 1 | 15 |
| Impact resistance improver | 10 | 10 | 10 | 10 | 10 | 10 | 10 | 10 | 10 |
| Maleic anhydride | — | — | — | — | 0.5 | — | — | — | — |
| Mechanical characteristics | | | | | | | | | |
| Flexural modulus (MPa) | 2330 | 2280 | 2270 | 2270 | 2350 | 2320 | 2360 | 1740 | 2270 |
| Izod impact strength with notch (kJ/m²) | 18 | 12 | 25 | 6 | 20 | 4 | 8 | 3 | 7 |
| Heat distortion temperature (°C.) | 162 | 152 | 178 | 174 | 177 | 178 | 180 | 94 | 183 |
| Retentative molding stability | ◉ | ○ | ○ | X | ○ | ○ | ○ | ○ | ○ |
| Color hue | ◉ | ○ | ◉ | ◉ | X | ○ | ○ | ◉ | ◉ |

From the results of the above evaluation tests, it can be seen that the thermoplastic resin composition of the present invention is excellent in impact resistance, heat resistance, retentive molding stability at high temperature molding and color hue, and said composition can be used for various purposes and it can become an industrially useful material.

We claim:

1. A thermoplastic resin composition which comprises
   (a) a polyphenylene ether and
   (b) a polyamide resin, and
   (c) 0.01 to 5 parts by weight of an acetal and
   (d) 0.01 to 5 parts by weight of a Lewis acid based on 100 parts by weight of the sum of (a) and (b) in total.

2. The composition according to claim 1, wherein said composition comprises
   (a) the polyphenylene ether and
   (b) the polyamide resin, and
   (c) 0.1 to 3 parts by weight of the acetal and
   (d) 0.1 to 3 parts by weight of the Lewis acid based on 100 parts by weight of the sum of (a) and (b) in total.

3. The composition according to claim 1, wherein said composition comprises
   (a) the polyphenylene ether and
   (b) the polyamide resin, and
   (c) 0.2 to 1.5 parts by weight of the acetal and
   (d) 0.2 to 1.5 parts by weight of the Lewis acid based on 100 parts by weight of the sum of (a) and (b) in total.

4. The composition according to claim 1, wherein said (a) and (b) are contained in the composition in amounts of
   (a) 2 to 98% by weight of the polyphenylene ether and
   (b) 98 to 2% by weight of the polyamide resin based on 100% by weight of the sum of (a) and (b).

5. The composition according to claim 1, wherein said (a) and (b) are contained in the composition in amounts of
   (a) 15 to 75% by weight of the polyphenylene ether and
   (b) 85 to 25% by weight of the polyamide resin based on 100% by weight of the sum of (a) and (b).

6. The composition according to claim 1, wherein said (a) and (b) are contained in the composition in amounts of
   (a) 25 to 60% by weight of the polyphenylene ether and
   (b) 75 to 40% by weight of the polyamide resin based on 100% by weight of the sum of (a) and (b).

7. The composition according to claim 1, wherein said acetal (c) is an oxymethylene homopolymer.

8. The composition according to claim 1, wherein said acetal (c) is trioxane.

9. The composition according to claim 1, wherein said Lewis acid (d) is a boron compound.

10. The composition according to claim 1, wherein said composition comprises:
    (a) 15 to 75% by weight of the polyphenylene ether selected from the group consisting of a homopolymer of 2,6-dimethylphenol, a copolymer of 2,6-dimethylphenol and 2,3,6-trimethylphenol, a copolymer of 2,6-dimethylphenol and 2,3,5,6-tetramethylphenol, and a copolymer of 2,6-diethylphenol and 2,3,6-trimethylphenol,
    (b) 85 to 25% by weight of the polyamide resin selected from the group consisting of 6,6-nylon, 6-nylon and a noncrystalline polyamide resin, and
    (c) 0.1 to 3 parts by weight of an acetal selected from the group consisting of 1,3-dioxolan, trioxane, tetraoxane, a polymer of formaldehyde, a polymer of acetaldehyde, 1,3,5-trioxacycloheptane, 1,3-dioxepane, 4H, 7H-1,3-dioxepine, 1,3,6-trioxacyclooctane, 1,3,6,9-tetraoxacyclodecane, 1,3,6,9-tetraoxacycloundecane, 1,3,6,9,12-pentaoxacyclotetradecane, 1,3,6,9,12,15-hexaoxacycloheptadecane and 2,7-dioxabicyclo[2.2.1]heptane and
    (d) 0.1 to 3 parts by weight of a boron compound selected from the group consisting of trialkyl boran, trialkyl borate, boric acid and halogenated boron (c) and (d) being based on 100 parts by weight of the sum of (a) and (b).

11. The composition according to claim 1, which further comprises 1 to 30 parts by weight of an impact resistance improver based on 100 parts by weight of the components (a) and (b) in total.

12. The composition according to claim 1, wherein said acetal is at least one selected from the group consisting of an oxymethylene copolymer, an oxymethylene homopolymer, paraformaldehyde, trioxane and tetraoxane.

13. The composition according to claim 12, wherein said acetal is an oxymethylene copolymer.

14. The composition according to claim 9, wherein said Lewis acid is boric acid.

* * * * *